May 2, 1950      F. L. STUCK      2,506,524

BATTERY PACK CONNECTION

Filed April 16, 1947

*INVENTOR.*
F. L. STUCK
BY A. Yates Dowell
ATTORNEY

Patented May 2, 1950

2,506,524

UNITED STATES PATENT OFFICE 2,506,524

BATTERY PACK CONNECTION

Frank L. Stuck, Lakeland, Fla.

Application April 16, 1947, Serial No. 741,789

7 Claims. (Cl. 171—97)

This invention relates to improvements in electrical devices and particularly to an improved battery pack connector for a portable electrical device such as a pocket radio.

In the design and manufacture of very small portable electrical devices, such as pocket radios and "hearing aids," it has been found somewhat difficult to provide an adequate switch for controlling the energizing current to the circuits without greatly increasing the size, cost, and weight of the device.

Although the switch is required to handle only an insignificant amount of electrical current, it has not been found possible because of mechanical difficulties to provide a switch of a size commensurate with the current to be controlled thereby, particularly when the current is supplied by a very small battery such as is commonly used to provide the energizing current for portable electrical devices of the character indicated above.

It is therefore an object of the present invention to provide a simplified arrangement for connecting a battery to a small portable electrical device, which arrangement renders the inclusion of a separate current controlling switch in the device unnecessary and serves the double function of attaching the battery to the device and either simultaneously energizing the circuits of the device or leaving the circuits unenergized.

A further object resides in the provision of an improved battery attaching and connecting means for a small portable electrical device, which attaching means also serves as a switch to control the operation of the device.

Figure 1:
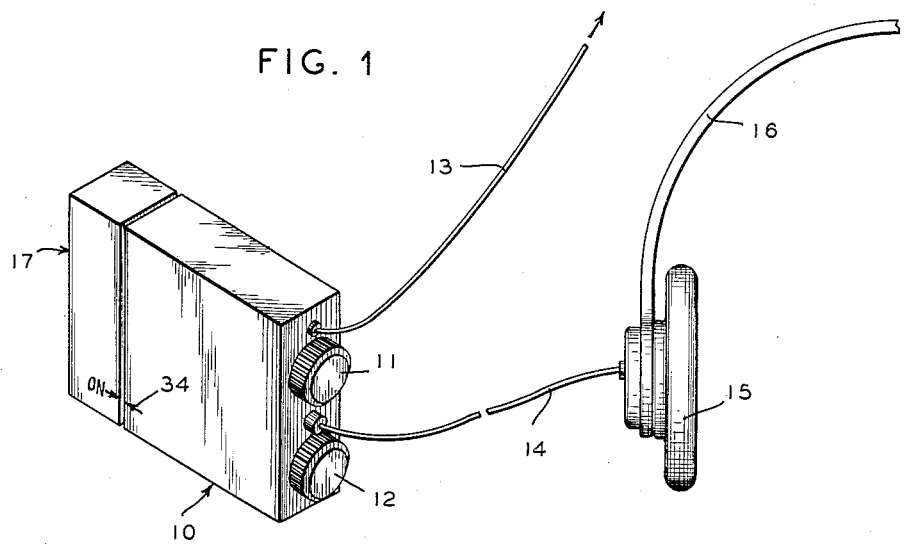
Figure 2:
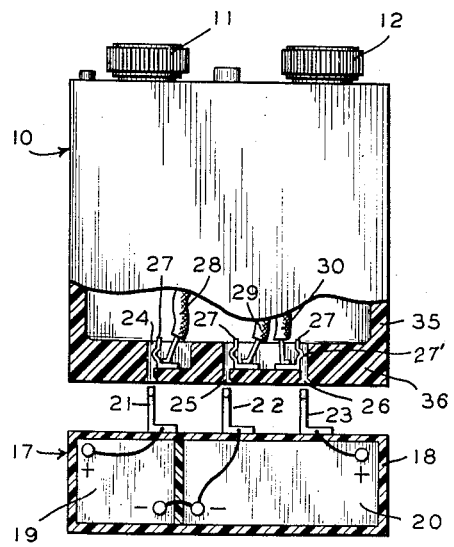
Figure 3:
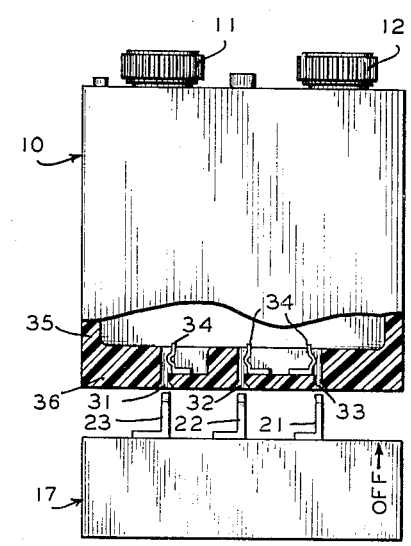
Figures 4, 5:
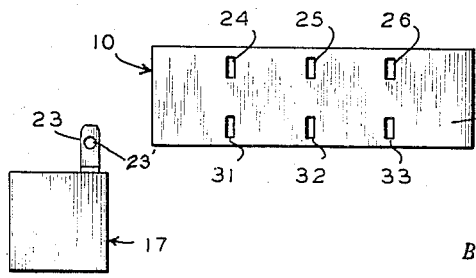

Other objects and advantages will become apparent from a consideration of the following description taken in conjunction with the accompanying drawing, wherein:

Fig. 1 is a perspective view of a complete portable electrical device, such as a pocket radio, illustrative of the invention;

Fig. 2 a side elevational view of the device shown in Fig. 1 showing the battery pack detached from the device and portions broken away and shown in section to better illustrate the construction thereof, this figure showing the battery connection in position to energize the circuits of the device;

Fig. 3, a view similar to Fig. 2 showing the battery connection in position to attach the battery to the remainder of the device without energizing the circuits thereof;

Fig. 4, an end elevational view of the battery pack illustrated in Figs. 2 and 3; and Fig. 5, a bottom plan view of the circuit receptacle portion of the device shown in Figs. 1, 2 and 3.

With continued reference to the drawing, the portable electrical device illustrated in Fig. 1 comprises a small receptacle, generally indicated at 10, which may be of generally rectangular shape, and which encloses an operative electric circuit of some conventional or desired arrangement. The receptacle 10, may, if desired, enclose the operating circuits of a pocket radio or "hearing aid" or other similar device and is of a size which can be conveniently carried in a coat pocket or lady's handbag. In one typical instance, the circuit receptacle and battery pack together constitute a unit about the size of an ordinary package of cigarettes.

The receptacle 10 is provided at one end with control knobs 11 and 12 of which the knob 11 may be a tuning knob and the knob 12 a volume control adjuster. An aerial wire 13 extends from the receptacle and an electrical conduit 14 also extends from the receptacle to a head phone 15 which may be mounted on a suitable band 16 for supporting it on the head of a user. A battery pack, generally indicated at 17, is secured to the end of the receptacle 10 opposite the end on which the control knobs 11 and 12 are mounted.

The battery pack 17 comprises a receptacle or container 18 which may conveniently be formed of a suitable synthetic resin plastic or of hard rubber, paper or metal, as may be desired, and encloses an A battery 19 and a B battery 20. Mounted on the casing or receptacle 18 are three pack prongs 21, 22, and 23. Of these the center prong 22 may be a common negative connection connected to the negative terminals of both batteries, while the prong 23 may be connected to the positive terminal of the B battery and the prong 21 to the positive terminal of the A battery. These prongs are mounted on the battery casing 18 and extend outwardly from one side of the casing substantially parallel to and adjacent an adjoining side of the casing disposed at right angles to the side from which the prongs extend, as is clearly illustrated in Fig. 4.

The receptacle 10 having side wall 35 and bottom wall 36, is also preferably formed of a non-conducting material such as a hard rubber or synthetic resin plastic and has a flat bottom surface, as illustrated in Fig. 5, provided with two separate sets of jack sockets for receiving the prongs 21, 22 and 23 of the battery pack. One set of these sockets as indicated at 24, 25 and 26 are the live sockets illustrated in Fig. 2. Each socket comprises a rectangular aperture extending through the bottom wall 36 of the receptacle 10 of a size to closely fit the jack prongs of the battery pack and has an elongated fixed wall and a spring detent 27 spaced from the wall in position to firmly engage one side of a jack prong when the prongs are inserted into the corresponding jack sockets. Preferably the spring detents are provided with bent portions 27' which engage in apertures 23' in the outer ends of the jack prongs to releasably hold the prongs in the sockets against accidental removal. In the case of the live sockets 24, 25 and 26, the corresponding spring detents are connected to the circuit included in the receptacle 10 by suitable connectors as indicated at 27, 28 and 29, respectively.

The opposite row of jack sockets, as indicated at 31, 32 and 33 in Fig. 5, are similar in all respects to the sockets 24, 25, and 26 except that the spring detents 34 thereof are not connected with the circuits of the mechanism.

With this arrangement, when the battery is in position with the jack prongs in the set of sockets 24, 25 and 26, the battery pack will be secured to the receptacle 10 and at the same time the circuits of the device will be energized. If the battery pack is removed from this position and turned around until the battery prongs are in alignment with the set of sockets 31, 32 and 33 and the prongs are then inserted in these sockets, the battery will be attached to the receptacle but the circuits of the device will not be energized by the battery. The arrangement therefore provides a means for attaching the battery pack to the receptacle in either one of two different positions in both of which positions the battery pack is in the same condition of alignment and continuity with the recptacle but in one of which the circuits within the receptacle are energized by the battery and in the other of which the circuits are not energized. The battery pack connection therefore functions as a switch to control the energizing current to the circuits of the device and also to attach the battery pack to the receptacle. In order to indicate the condition of the device, one side of the battery pack may be marked with the word "On," as is illustrated in Fig. 1, and the opposite side may be marked with the word "Off," as illustrated in Fig. 3, the receptacle being provided with an indicating arrow 37 which cooperates with the words "Off" and "On" to indicate the condition of the device.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. In combination a battery pack having battery connected jack prongs extending therefrom and an electric circuit containing receptacle having a plurality of sets of jack sockets one of said sets having no electrical connection with said circuit, said prongs and sockets being so arranged that when said battery pack is attached and supported by said prongs on said receptacle by one set of jacks said circuit is energized by said battery and when said battery pack is attached and supported by the other set of jacks said circuit is not energized.

2. In combination a circuit-containing receptacle having two sets of jack sockets arranged in two separate rows with the sockets of each set in substantial alignment in a corresponding row, means connecting the sockets of one row only to the electrical circuits within said receptacle, and a battery pack having a single row of jack prongs engageable with either row of jack sockets in said receptacle for attaching and supporting said battery pack on said receptacle or for simultaneously attaching and supporting said battery pack on said receptacle and energizing said circuits.

3. The combination as set forth in claim 2 wherein said jack prongs extend outwardly from one side of said battery pack parallel to and adjacent a side adjoining and at right angles to the side from which said prongs extend.

4. In combination a circuit receptacle and a battery pack and means operatively associated with said receptacle and said battery pack for attaching and supporting said battery pack on said receptacle and simultaneously energizing said circuit and for attaching and supporting said battery pack on said receptacle without energizing said circuit.

5. The combination defined in claim 4 wherein said battery pack has a single set of attaching means common to both conditions of attachment of said battery pack to said circuit containing receptacle.

6. For use with a circuit containing receptacle requiring electrical energy, a battery pack having batteries therein, combined pack attaching, supporting and switching means comprising a plurality of jack prongs carried by said pack and connected to said batteries and a plurality of complementary prong receiving sockets carried by said receptacle, certain of said sockets being connected to said circuit, the remaining sockets having no connections, whereby upon insertion of said prongs in said connected sockets said pack will be supported from said receptacle and said circuit will be energized and upon withdrawal of said prongs and insertion in said unconnected sockets said pack will be supported from said receptacle and said circuit will not be energized.

7. A combined supporting and switching means for use with a battery pack and a circuit containing receptacle comprising means protruding from said pack and connected to the battery contained therein, complementary means on said receptacle for receiving said battery connected means, certain of the means on said receptacle being connected to said circuit and the remaining means being unconnected whereby upon insertion of said battery connected means into said circuit connected means said pack will be supported from said receptacle and said circuit will be energized, and upon withdrawal of said means and insertion in said unconnected means, said pack will be supported from said receptacle and said circuit will not be energized.

FRANK L. STUCK.

REFERENCES CITED

The following references are of record in the file of this patent:

UNITED STATES PATENTS

| Number | Name | Date |
| --- | --- | --- |
| 1,783,899 | Barton | Dec. 2, 1930 |
| 2,209,185 | Bower et al. | July 23, 1940 |
| 2,265,233 | Jackson et al. | Dec. 9, 1941 |
| 2,246,110 | Sidnell | June 17, 1941 |